United States Patent
Iwaki et al.

(10) Patent No.: US 6,246,139 B1
(45) Date of Patent: Jun. 12, 2001

(54) SPINDLE MOTOR AND METHOD OF FORMATION

(75) Inventors: Tadao Iwaki; Hiromitsu Goto; Naoki Kawawada; Takafumi Suzuki; Mitsuharu Iwamoto, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/535,379

(22) Filed: Mar. 24, 2000

(30) Foreign Application Priority Data

Mar. 25, 1999 (JP) .................................................. 11-082279

(51) Int. Cl.[7] .............................. H02K 15/00; H02K 7/08
(52) U.S. Cl. ............................. 310/90; 310/42; 310/67 R
(58) Field of Search ................................. 310/42, 67 R, 310/261, 90; 39/596; 29/598

(56) References Cited

FOREIGN PATENT DOCUMENTS

| 9-308153 | * | 11/1997 | (JP) | ................................. | H02K/1/27 |
| 10-098849 | * | 4/1998 | (JP) | ................................. | H02K/7/08 |
| 9-233791 | * | 9/1998 | (JP) | ................................. | H02K/15/02 |

* cited by examiner

Primary Examiner—Burton Mullins
(74) Attorney, Agent, or Firm—Adams & Wilks

(57) ABSTRACT

In a method for assembling a spindle motor having a liquid dynamic pressure bearing having a flanged shaft member formed by press-fitting a dynamic pressure ring member on a cylindrical member, a hub is press-fit on the flanged shaft member without causing deviation in the press-fit position of the dynamic pressure ring member. A hub press-fitting apparatus press fits a mount hole of the hub on a cylindrical end portion of the cylindrical member. The hub press-fitting apparatus comprises a hub holding member, a rotation shaft member, a coupling member, and an anti-rotation member. During assembly, a temporary coupling between the hub press-fitting apparatus and the liquid dynamic pressure bearing is made by screwing a threaded tap in a tap hole provided in an end face of the cylindrical member.

3 Claims, 7 Drawing Sheets

SPINDLE MOTOR AND METHOD OF FORMATION

BACKGROUND OF THE INVENTION

The present invention relates to a spindle motor having a rotor rotatably supported on a stator through a liquid dynamic pressure bearing having a flanged shaft member and a cylindrical receiving member in which the shaft member is rotatably received and having a cup-formed hub press-fitted on the flanged shaft member, and to a method for assembling the spindle motor.

The present assignee applicant has developed and applied for a patent (Japanese Patent Application No. H09-36380/1997) for a liquid dynamic pressure bearing having a flanged shaft member 1 and a cylindrical receiving member 4, one embodiment of which is shown in FIG. 7, and a spindle motor having such a liquid dynamic pressure bearing. That is, the liquid dynamic pressure bearing shown in FIG. 7 has a flanged shaft member 1 in a cross-formed section integrally formed by a cylindrical member 2 and a thrust dynamic pressure disk member 3, and a cylindrical receiving member 4. An annular lid member 5 serves also as a thrust holding plate.

The spindle motor includes, besides the liquid dynamic pressure bearing structured as above, a cup-formed hub 6 coaxially fixed on an end of the flanged shaft member 1 to support a rotary member such as a hard disk, a rotor magnet 7 attached on an inner peripheral surface of a sleeve portion of the cup-formed hub 6, a stator coil 8 attached on an outer peripheral surface of the cylindrical receiving member 4 to generate a rotation force in cooperation with the rotor magnet 7, and a base plate 9 in which the cylindrical receiving member 4 is provided.

The liquid dynamic pressure bearing, structured by the flanged shaft member 1 having a cross-formed section formed with a thrust dynamic pressure disk member 3a at an axial center and the cylindrical receiving member 4 rotatably accommodating the flanged shaft member, is removed of a problem involved in the conventional dynamic pressure bearing structured by a flanged shaft member having a T-formed section formed with a thrust dynamic pressure disk member 3a at one end of the shaft and a receiving member rotatably accommodating the flanged shaft member, i.e., rotation instability resulting from half whale phenomenon caused by disagreement in direction of a shaft displacement and a restoration force against the displacement during high speed rotation.

However, there has been a problem that the flanged shaft member 1 having the cross-formed section integrally formed with two members of the cylindrical member 2 and the thrust dynamic pressure disk member 3a is fabricated by machining and hence is high in manufacture cost. To avoid this, a spindle motor one embodiment of which is as shown in FIG. 6 has been developed. That is, in FIG. 6 a flanged shaft member 1 is fabricated by machining as respective separate members one cylindrical member 2 and a dynamic pressure producing ring member 3 and then assembling these two members together. This solved the problem with manufacture cost involved in the spindle motor of FIG. 7.

Nevertheless, another problem has arisen in assembling such a spindle motor. The assembling of the spindle motor of FIG. 6 includes, after a process of inserting and arranging in a cylindrical receiving member 4 a flanged shaft member 1 fabricated by press-fitting a dynamic pressure ring member 3 onto a cylindrical member 2, a process of press-fitting an annular holding member 5 in an annular step 4b formed in an opening end of the cylindrical receiving member 4, and thereafter a process of press-fitting a cup-formed hub 6 having a mount hole 6a at a center onto the flanged shaft member 1. The problem lies in that the dynamic pressure ring member 3 deviates off a specified press-fit position when press-fitting the hub 6 onto the flanged shaft member 1 by applying an urging force. This deviation is caused due to receiving an urging force applied to the hub 6 at the annular step 4a at a boundary of smaller and larger diameter cylindrical portions of the cylindrical receiving member 4 when press-fitting the hub 6 to the flanged shaft member 1 by applying an urging force. This deviation is slight as small as on the order of a micron, but crucial for a liquid dynamic pressure bearing.

The above problem with assembling would not occur if a cylindrical member 2 and a cup-formed hub 6 were made in one body. However, the integral form with a cylindrical member 2 and a cup-formed hub 6 is extremely difficult to mass-produce at low cost, similarly to a flanged shaft member 1 having a cross-formed section integrally formed with two members of a cylindrical member 2 and a dynamic pressure ring member 3.

Eventually, for a spindle motor having a liquid dynamic pressure bearing having as basic constituent members a flanged shaft member fabricated by press-fitting a dynamic pressure ring member on a cylindrical member and a cylindrical receiving member rotatably receiving this shaft member, it is left unsolved to press-fit the cup-formed hub onto the flanged shaft member in a manner not to deviate the dynamic pressure ring member off a specified press-fit position. Due to this, it is impossible to meet the requirement of mass-producing the spindle motors at low cost.

SUMMARY OF THE INVENTION

The problem to be solved by the invention is to reduce manufacture cost for a spindle motor having a liquid dynamic pressure bearing having as basic constituent members a flanged shaft member made by press-fitting a dynamic pressure ring member on a cylindrical member and a cylindrical receiving member rotatably fitted with the shaft member. The more concrete problem to be solved is to fit a cup-formed hub onto the flanged shaft member in a manner not to deviate the dynamic pressure ring member press-fitted on the cylindrical member off a specified press-fit position.

In order to solve the above problem, a spindle motor has a liquid dynamic pressure bearing having a flanged shaft member formed by press-fitting a dynamic pressure ring member on a cylindrical member, a cylindrical receiving member rotatably receiving the flanged shaft member and an annular holding member press-fitted in an annular step formed in an opening end of said cylindrical receiving member; a rotor rotatably supported on a stator through the liquid dynamic pressure bearing having a fine gap between a lower end of the cylindrical member and a bottom surface of the cylindrical receiving member, and a hub structuring part of the rotor being press-fitted on the flanged shaft member; wherein the hub is press-fitted on the flanged shaft member by pulling an upper end of the cylindrical member through a mount hole of the hub while holding the hub.

Also, in a method for assembling a spindle motor having a liquid dynamic pressure bearing having a flanged shaft member formed by press-fitting a dynamic pressure ring member on a cylindrical member, a cylindrical receiving member rotatably receiving the flanged shaft member and an annular holding member press-fitted in an annular step formed in an opening end of said cylindrical receiving member; wherein a rotor is rotatably supported on a stator through the liquid dynamic pressure bearing having a fine gap between a lower end of the cylindrical member and a bottom surface of the cylindrical receiving member, and a hub structuring part of the rotor being press-fitted on the flanged shaft member, the method for assembling the spindle includes: a first step of arranging the flanged shaft member on the cylindrical receiving member; a second step of press-fitting the annular holding member in an opening end of the cylindrical receiving member; and a third step of press-fitting the flanged shaft member in the hub by pulling an upper end of the cylindrical member through a mount hole of the hub while holding the hub.

Furthermore, a hub press-fitting apparatus to be used in a method for assembling a spindle motor, i.e., an apparatus for press-fitting a hub on a flanged shaft member by a pulling force instead of an urging force, comprises: a hub holding member generally in a cup form having a threaded through hole in a bottom portion, a rotation axis member having a thread portion to be screwed to the threaded through hole and a free joint portion; a cylindrical coupling member having an end abutting against the free joint portion and an end formed with a threaded tap screwed to a tap hole provided at an upper end of the cylindrical member; and anti-rotation means for the cylindrical coupling member.

DETAILED DESCRIPTION OF THE PREFERRED EMBODIMENT

Figure 3:
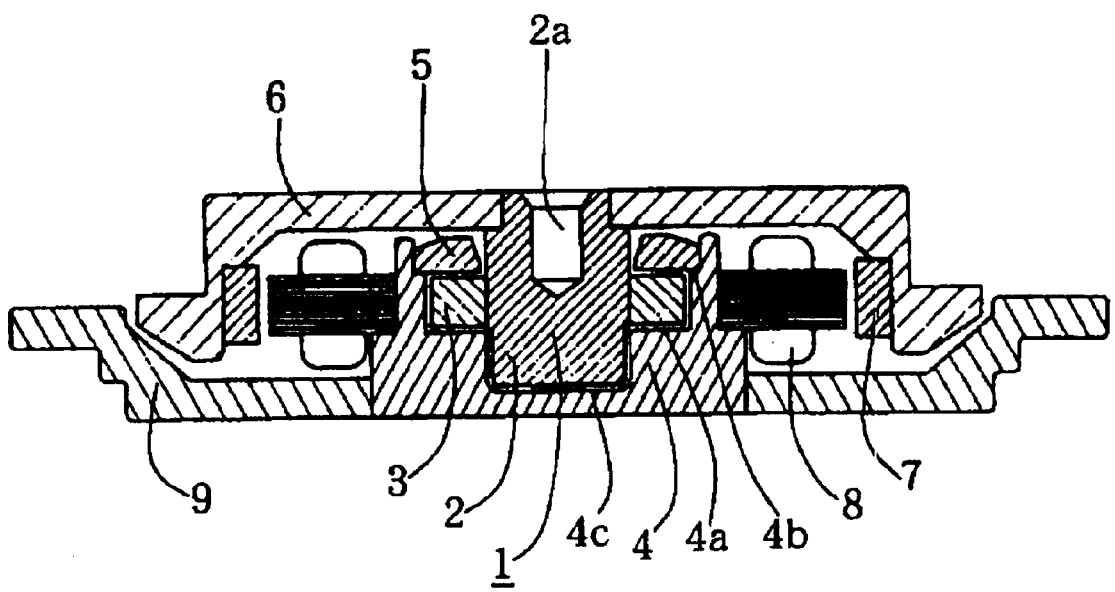
FIG. 3 is a sectional view of one embodiment of a spindle motor having a liquid dynamic pressure bearing according to the invention.
Figure 6:
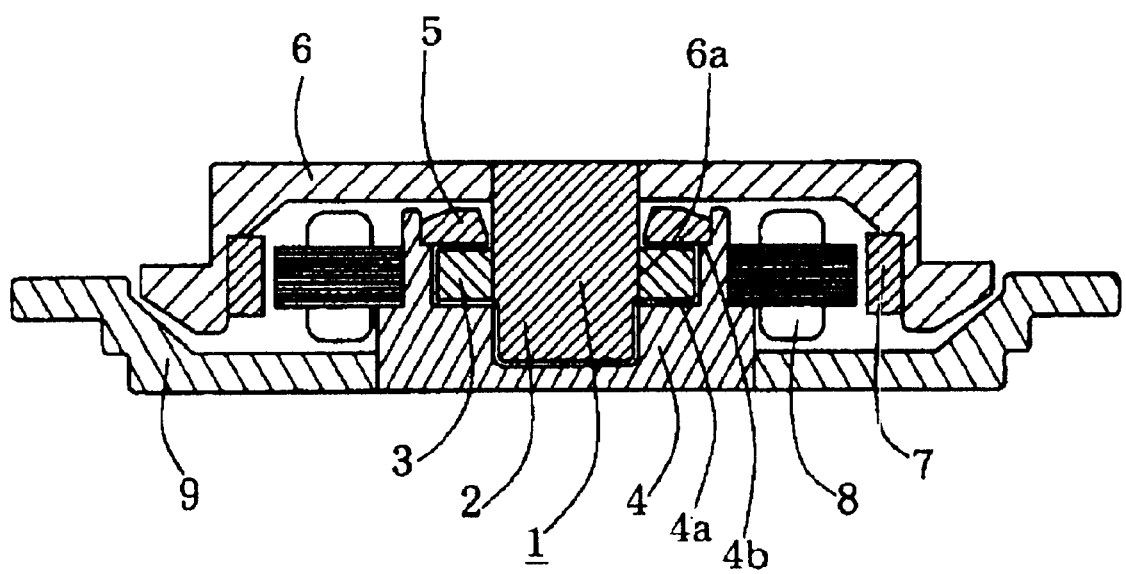
FIG. 6 is a sectional view of a spindle motor having a conventional liquid dynamic pressure bearing.
Figure 7:
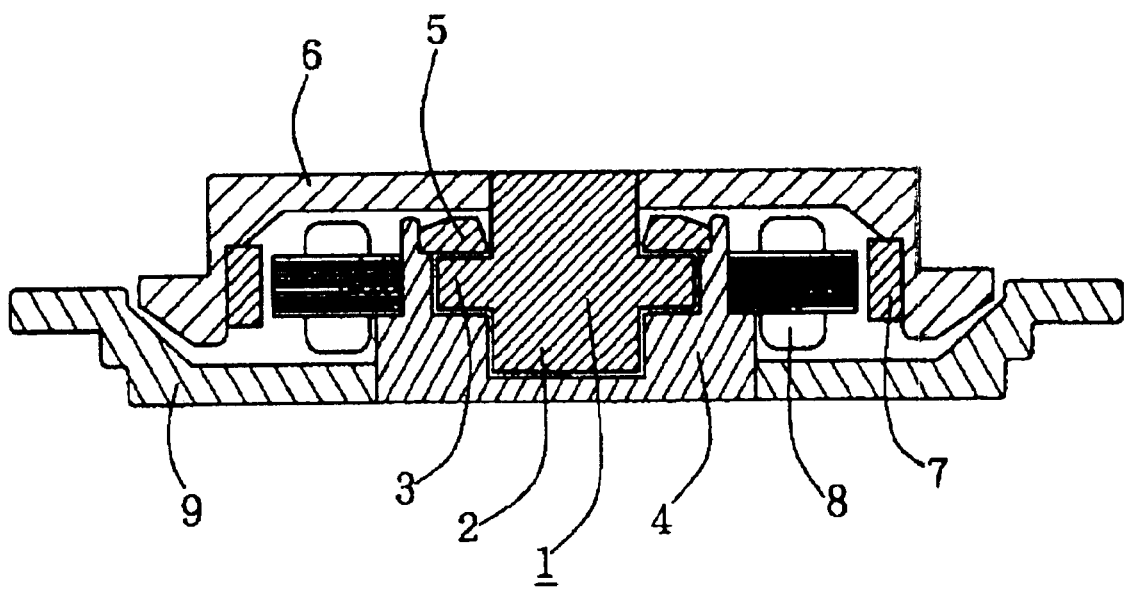
FIG. 7 is a sectional view of a spindle motor having a conventional liquid dynamic pressure bearing.

FIG. 3 shows one embodiment of a spindle motor according to the present invention. The spindle motor includes a liquid dynamic pressure bearing basically structured by a flanged shaft member 1 and a cylindrical receiving member 4. The spindle motor is structured, basically similar to the spindle motor of FIG. 6, by a liquid dynamic pressure bearing having as basic structural parts a flanged shaft part 1 and a cylindrical receiving part 4, a cup-formed hub 6 coaxially secured to an end of the flanged shaft member 1 to support a rotary member such as a hard disk, a rotor magnet 7 attached on an inner peripheral surface of a sleeve portion of the cup-formed hub 6, a stator coil 8 attached on an outer peripheral surface of the cylindrical receiving member 4 to cause a rotation force in cooperation with the rotor magnet 7, and a base plate 9 in which the cylindrical receiving member 4 stands.

The spindle motor of the invention adopts the liquid dynamic pressure bearing, i.e., the flanged shaft member 1 formed by fitting a dynamic pressure ring member 3 on a cylindrical member 2, the cylindrical receiving member 4 with which the flanged shaft member 1 is rotatably fitted and an annular holding member 5 press-fitted in an annular step 4b formed in an opening end of the cylindrical receiving member 4. The structure and operation of the liquid dynamic pressure bearing in general will be described below, though detailed explanation thereof is omitted because of the description given in Japanese Patent Application No. H09-36380/1997 stated before. The flanged shaft member 1 is formed by separately machining a cylindrical member 2 and a dynamic pressure ring member 3 and thereafter these two members are assembled by fitting the latter on the former. These members use, for example, phosphor bronze or a copper based material. These two members are assembled by press-fitting the dynamic pressure ring member 3 onto the cylindrical member 2 with an urging force applied from a lower end thereof while holding the cylindrical member 2.

Figure 4:
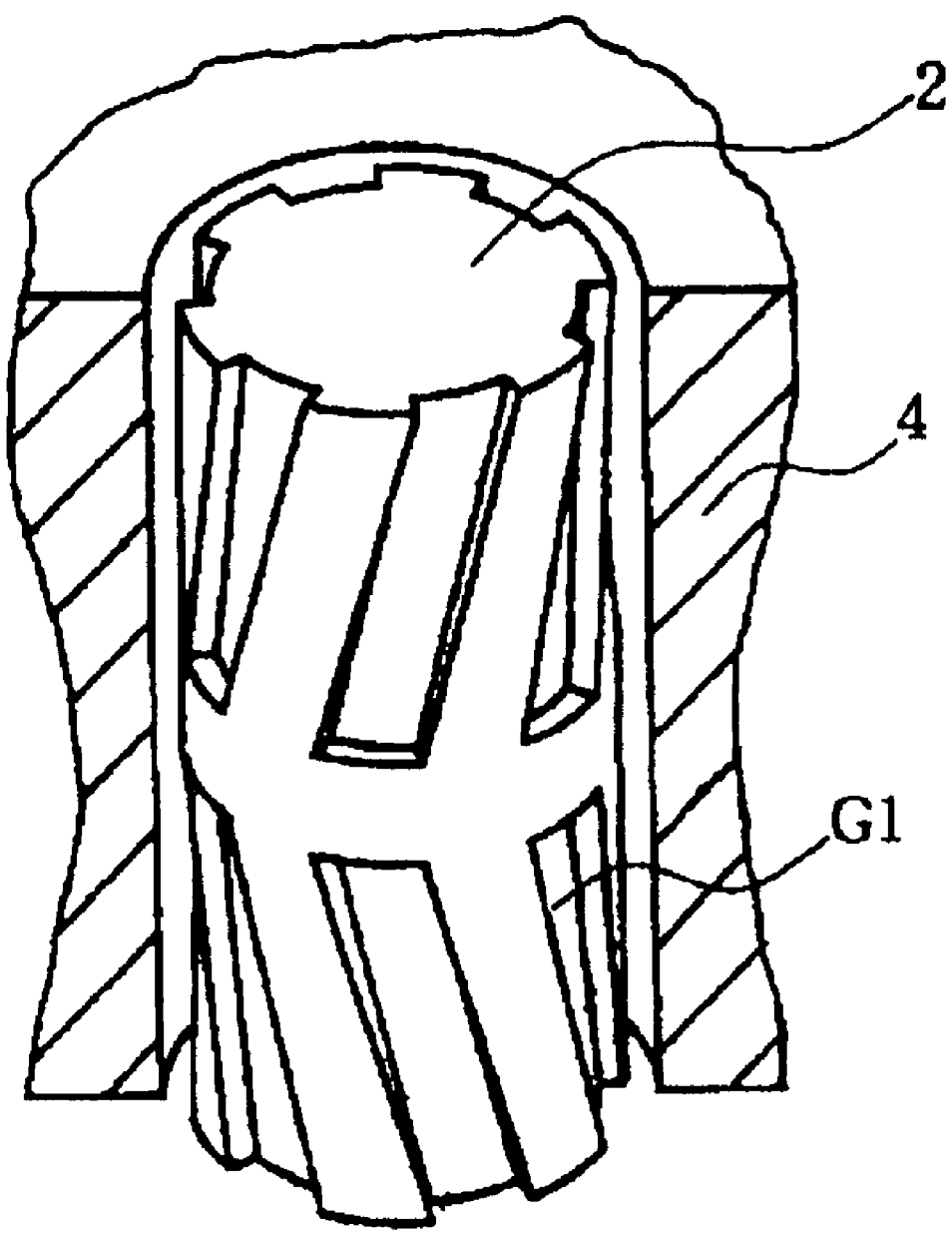
FIG. 4 is a figure showing one example of a radial dynamic pressure generating groove of the liquid dynamic pressure bearing.
Figure 5:
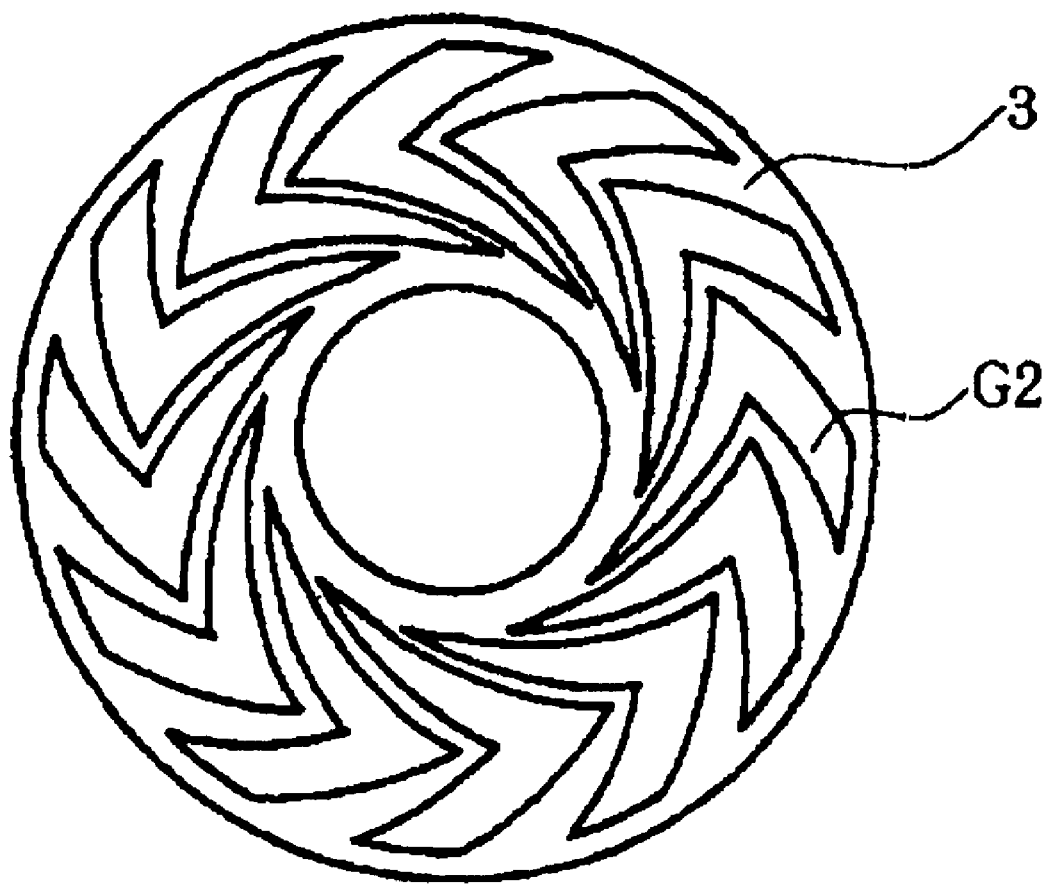
FIG. 5 is a figure showing one example of a thrust dynamic pressure generating groove of the liquid dynamic pressure bearing.

The dynamic pressure ring member 3 has thrust dynamic pressure producing grooves G2, such as herringbone grooves as shown FIG. 5, formed respectively in upper and lower surfaces thereof. The cylindrical member 2 has a radial dynamic pressure producing groove G1, such as a partial groove or herringbone groove as shown in FIG. 4, formed in an outer peripheral surface of the lower cylindrical portion thereof. Incidentally, the radial dynamic pressure producing groove G1 may be provided in an outer peripheral surface of the dynamic pressure ring member 3 instead of in the cylindrical member 2.

Lubrication oil is filled in a plurality of fine gaps given between the flanged shaft member 1 and the cylindrical receiving member 4 and between the annular holding member 5 and the cylindrical receiving member 4. Consequently, when the flanged shaft member 1 rotates, thrust dynamic pressure is produced in the fine gaps between an upper surface of the dynamic pressure ring member 3 and a lower surface of the annular holding member 5 and in the fine gaps between lower surface of the dynamic pressure ring member 3 and the annular step 4a of the cylindrical receiving member 4, thus holding an axial load. Meanwhile, upon rotating the flanged shaft member 1, radial dynamic pressure is produced in the fine gaps between the outer peripheral surface of the lower cylindrical portion of the cylindrical member 2 and the inner peripheral surface of the lower cylindrical portion of the cylindrical receiving member 4, thereby supporting a radial load. In the case where the radial dynamic pressure groove GI is provided in an outer peripheral surface of the dynamic pressure ring member 3 instead of in the cylindrical member 2, radial dynamic pressure occurs in fine gaps between the outer peripheral surface of the dynamic pressure ring member 3 and the inner peripheral surface of the upper cylindrical portion of the cylindrical receiving member 4.

The fine gaps, provided between the lower end surface of the cylindrical portion 2 or the flanged shaft member 1 and the bottom surface of the cylindrical receiving member 4, serve basically as an oil reservoir. The oil reservoir is required for a liquid dynamic pressure bearing to prevent against decrease in dynamic pressure due to partial shortage of lubrication oil within the gap flowing at high speed between the bearing gaps during high speed rotation.

The spindle motor is constructed as above. That is, the liquid dynamic pressure bearing is formed by the flanged shaft member 1 formed by fitting the dynamic pressure ring member 3 in the cylindrical member 2, the cylindrical receiving member 4 with which the flanged shaft member 1 is rotatably fitted, and the annular holding member 5 fitted in the annular step 4b formed in the opening end of the cylindrical receiving member 4. Through the liquid dynamic pressure bearing the rotor is rotatably supported on the stator wherein the hub 6 forming part of the rotor is press-fitted on the flanged shaft member 1. The assembling process of the spindle motor includes a first step of arranging the flanged shaft member 1 on the cylindrical receiving member 4, and a second step of press-fitting the annular holding member 5 in the annular step 4b formed in the opening end of the cylindrical receiving member 4. These two steps are similarly included in the assembling process of the conventional spindle motor shown in FIG. 6.

Although the stator coil 8 is mounted in a predetermined position in the outer peripheral surface of the cylindrical receiving member 4 forming part of the stator, the stator coil may be attached before the first step or after the second step. After completing the first and second processes as well as the stator coil mounting, a hub press-fit process is carried out.

There has involved an unsolved problem in the hub press-fit process. That is, the presence of a fine gap between a lower end surface of a cylindrical member 2 and a bottom surface 4c of a cylindrical receiving member 4 causes a problem of deviation in position of a dynamic pressure ring member 3 when a hub 6 is press-fitted onto the cylindrical member 2 by application of an urging force. Accordingly, the present invention has solved the problem by applying a tensile force to the hub.

Figure 1:
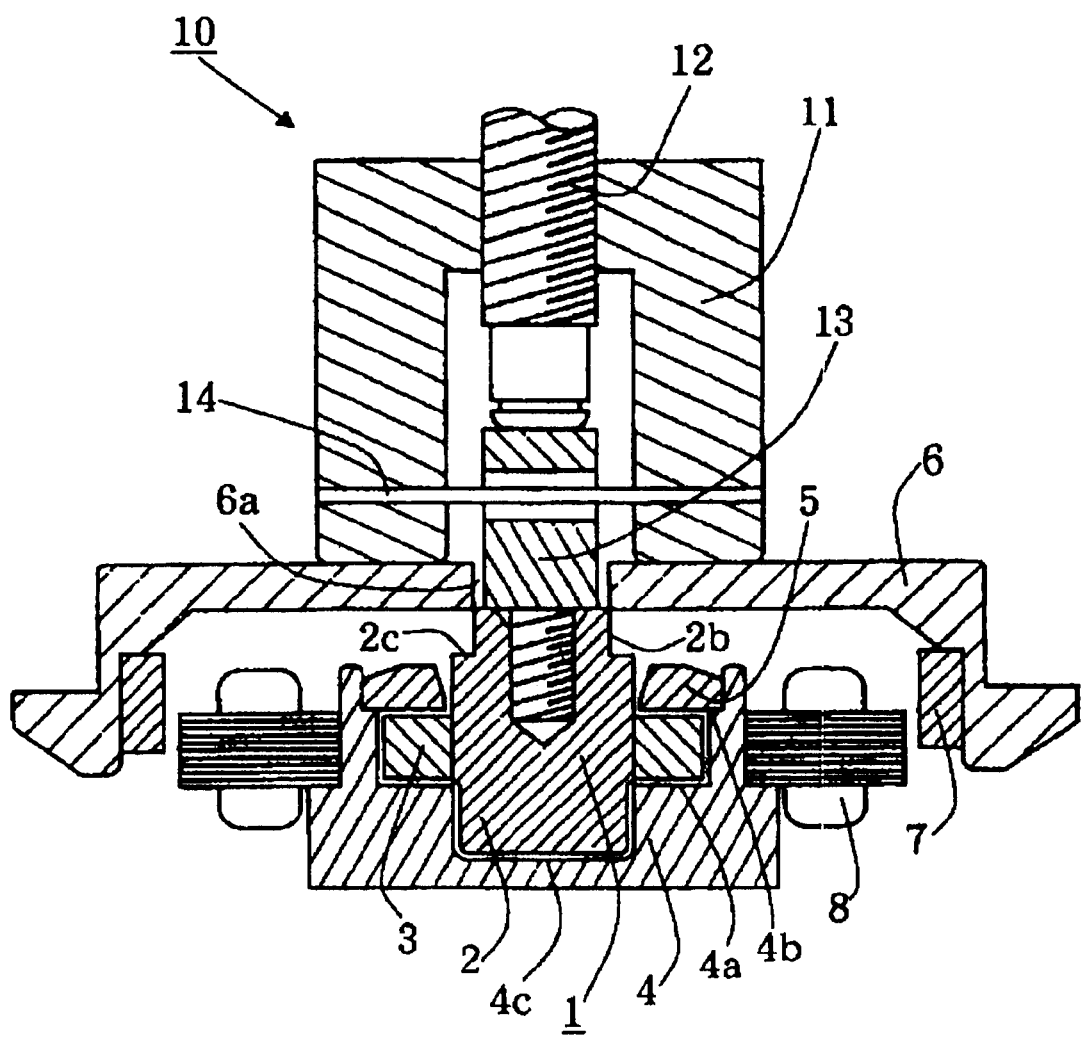
FIG. 1 is a figure showing one embodiment of a method for assembling a spindle motor by using a hub press-fitting apparatus according to the present invention.
Figure 2:
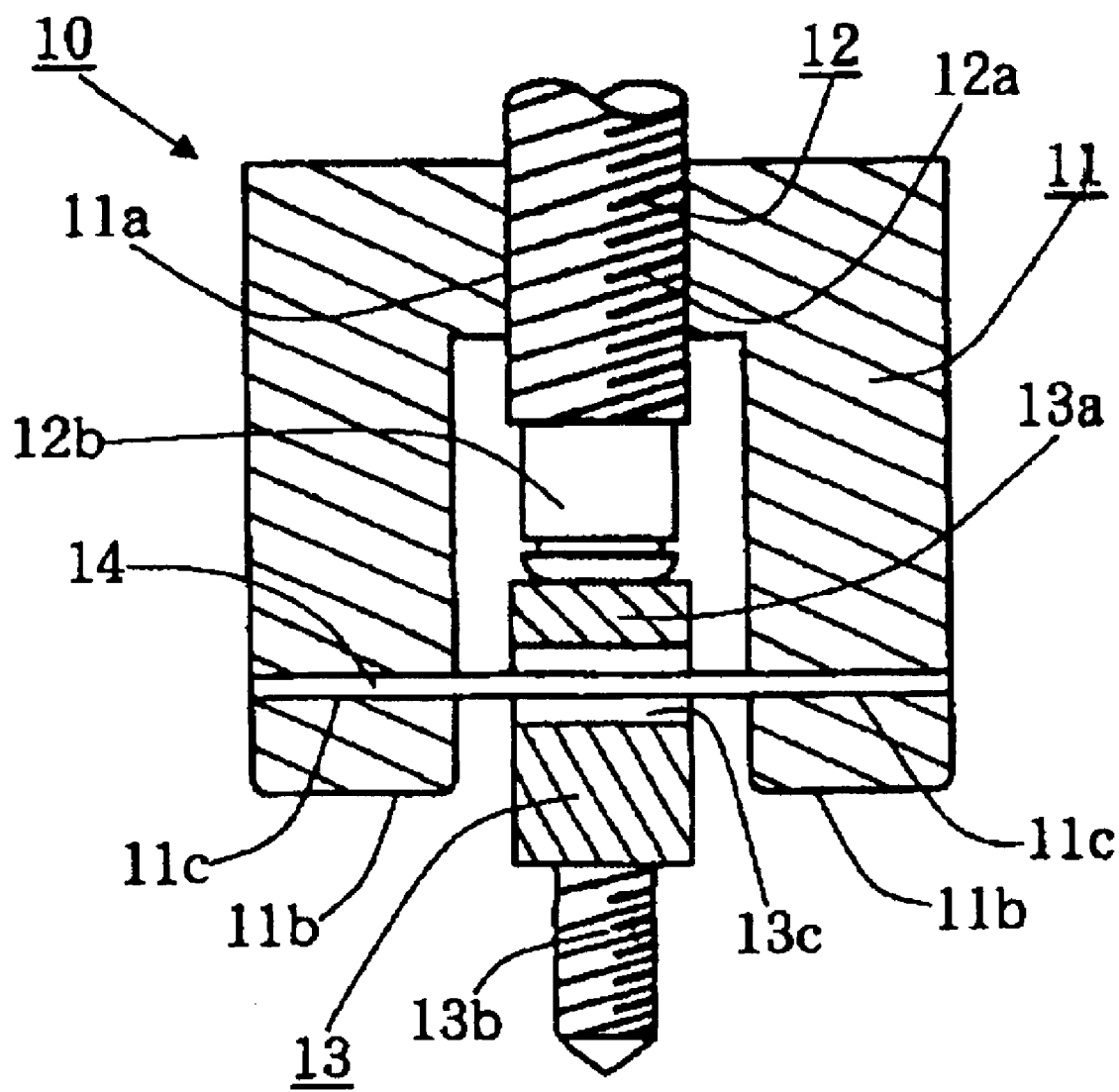
FIG. 2 is an essential part sectional view of one embodiment of a hub press-fitting apparatus according to the invention.

That is, a novel hub press-fit device 10 is used to apply a tensile force instead of an urging force to enable a hub to be press-fit onto a flanged shaft member 1. The hub press-fit device 10 comprises, as shown in FIG. 1 and FIG. 2, a hub holding member 11 to hold a hub 6, a rotary axis member 12 as means to apply a tensile force to the hub 6, a coupling member 13 to couple between the rotary shaft member 12 and a flanged shaft member 1, and an anti-rotation means 14 for the coupling member 13.

The hub holding member 11 is generally in a cup form having a threaded through-hole 11a at a bottom and a flat annular end face 11b to horizontally receive a hub 6. The rotary shaft member 12 has a thread portion 12a screwed in the threaded through-hole 11a and a free-joint portion 12b. The coupling member 13 is a cylindrical member having an end 13a abutting against an end face of the free joint portion 12b and a threaded tap 13b to be screwed in a tap hole 2 provided at an upper end of the cylindrical member 2. The anti-rotation means 14 is, for example, a pin passing through a through-hole 13c provided close to an end 13a of the cylindrical member 13 and a through-hole 11c in the vicinity of the annular end 11b of the rotary shaft member 12. The anti-rotation means 14 acts such that the flanged shaft member 1 to be screwed to the coupling member 13 can not relatively rotate.

The hub press-fit process is to be conducted using the hub press-fit device 10 as described below. That is, the flanged shaft member 1 is put in the cylindrical receiving member 4 and the annular holding member 5 is press-fit in the annular step 4b formed at the opening end of the cylindrical receiving member 4. A liquid dynamic pressure assembly in its fine gap is filled by lubrication oil by a lubrication oil charging device, not shown, thus completing the assembling for a liquid dynamic pressure bearing. The assembled liquid dynamic pressure bearing is temporarily coupled to the hub press-fit device 10 by passing through a mount hole 6a of the hub 6 mounted with a rotor magnet 7 at an inner peripheral predetermined position. The coupling of the liquid dynamic pressure bearing to the hub press-fit device is made by screwing the threaded tap 13b of the cylindrical coupling member 13 into the tap hole 2a provided at the upper end of the cylindrical member 2 of the flanged shaft member 1.

After screwing the threaded tap 13b to the tap hole 2a, the pin 14 is inserted through the through-holes 11c and 13c thus preventing relative rotation. When the rotary shaft member 12 is rotated, the cylindrical member 2 of the flanged shaft member 1 being coupled through the free joint portion 12b is moved toward the hub 6 because the hub holding member 11 at its annular end surface 11b holds the upper surface of the hub 6 and the cylindrical member 2 at its end in a state to be fit in the mount hole 6a of the hub 6. That is, the rotation of the rotary shaft member 12 applies a certain tensile force to the cylindrical end 2b of the cylindrical member 2. Through the tensile force, the cylindrical member 2 at its cylindrical end 2b is press-fit in the mount hole 6a of the hub 6. This movement is completed by abutment of a peripheral lower surface of the mount hole 6a of the hub 6 against the step 2c of the cylindrical member 2. Thereafter, the hub press-fit device 10 is removed from the liquid dynamic pressure bearing. Thereby completing press-fitting of the hub 6 to the flanged shaft member 1. This assembly is thereafter fixed on a base plate of a motor, completing assembling for a spindle motor. In this hub press-fit process, the dynamic pressure ring member 3 being press-fit in the cylindrical member 2 is not applied by any force. Accordingly, there is no possibility that the dynamic pressure ring member 3 deviates on the cylindrical member 2 during assembling for a spindle motor.

According to the present invention, a spindle motor has a liquid dynamic pressure bearing having a flanged shaft member formed by press-fitting a dynamic pressure ring member on a cylindrical member; wherein a rotor is rotatably supported on a stator through the liquid dynamic pressure bearing having a fine gap between a lower end of the cylindrical member and a bottom surface of the cylindrical receiving member, and a hub structuring part of the rotor being press-fitted on the flanged shaft member; and wherein: the hub is press-fitted on the flanged shaft member by pulling an upper end of the cylindrical member through a mount hole of the hub while holding the hub. Accordingly, there is no possibility that the dynamic pressure ring member be positionally deviated during an assembling operation for a spindle motor. Also, because the hub press-fit apparatus according to the invention is comparatively simple in structure and hence realized by working a commercially available tool, it is possible to reduce the manufacture cost. Above all, the present invention makes possible to meet a requirement of providing a large number of spindle motors that are high in performance but low in cost by utilizing various features of the liquid dynamic pressure bearing having a flanged shaft member formed by press-fitting a dynamic pressure ring member on a cylindrical member.

What is claimed is:

1. A spindle motor comprising: a liquid dynamic pressure bearing having a flanged shaft member formed by press-fitting a dynamic pressure ring member on a cylindrical member, a cylindrical receiving member rotatably receiving the flanged shaft member and an annular holding member press-fitted in an annular step formed in an opening end of the cylindrical receiving member; and a rotor rotatably supported on a stator through the liquid dynamic pressure bearing having a fine gap between a lower end of the cylindrical member and a bottom surface of the cylindrical receiving member, the rotor having a hub for supporting a rotary member during use of the spindle motor, the hub being press-fitted on the flanged shaft member by pulling an upper end of the cylindrical member through a mount hole of the hub while holding the hub.

2. In a method for assembling a spindle motor having a liquid dynamic pressure bearing having a flanged shaft member formed by press-fitting a dynamic pressure ring member on a cylindrical member, a cylindrical receiving member rotatably receiving the flanged shaft member and an annular holding member press-fitted in an annular step formed in an opening end of the cylindrical receiving member; and a rotor rotatably supported on a stator through the liquid dynamic pressure bearing having a fine gap between a lower end of the cylindrical member and a bottom surface of the cylindrical receiving member, the rotor having a hub for supporting a rotary member during use of the spindle motor, and the hub being press-fitted on the flanged shaft member, the method for assembling the spindle motor comprising at least:

a first step of arranging the flanged shaft member on the cylindrical receiving member;

a second step of press-fitting the annular holding member in an opening end of the cylindrical receiving member; and a third step of press-fitting the flanged shaft member in the hub by pulling an upper end of the cylindrical member through a mount hole of the hub while holding the hub.

3. An apparatus for press-fitting a hub on a flanged shaft member to be used in a method for assembling a spindle motor according to claim 2, the apparatus comprising:

a hub holding member having a generally cup shape and having a threaded through-hole in a bottom portion thereof;

a rotation axis member having a thread portion to be screwed to the threaded through-hole and a free joint portion;

a cylindrical coupling member having an end abutting against the free joint portion and an end formed with a threaded tap screwed to a tap hole provided at an upper end of the cylindrical member; and anti-rotation means for the cylindrical coupling member.

* * * * *